Sept. 20, 1966 W. E. FRANK 3,273,447
DETECTION AND MEASUREMENT DEVICE HAVING A SMALL FLEXIBLE
FIBER TRANSMISSION LINE
Filed Aug. 26, 1963

INVENTOR.
WALLACE E. FRANK
BY Howson & Howson
ATTYS.

United States Patent Office 3,273,447
Patented Sept. 20, 1966

3,273,447
DETECTION AND MEASUREMENT DEVICE HAVING A SMALL FLEXIBLE FIBER TRANSMISSION LINE
Wallace E. Frank, Westtown, Pa., assignor to The Franklin Institute, Philadelphia, Pa., a corporation of Pennsylvania
Filed Aug. 26, 1963, Ser. No. 304,484
5 Claims. (Cl. 88—1)

This application is a continuation-in-part of my copending application Serial No. 791,479, filed Feb. 5, 1959, now abandoned.

This invention relates to improvements in ultra small devices for detecting and measuring movements, particularly in remote and otherwise inaccessible places. More particularly, this invention relates to a fiberoptics system including a force or pressure sensitive transducer element which is used to indicate or measure movements indicative of temperature, pressure, acceleration, magnetic or electrostatic fields, and other quantities.

Heretofore, ultra small gauges have been developed and used for introduction into a blood vessel and even for movement through blood vessels into the heart to measure blood pressure at specific locations. Such gauges have found only limited use in other scientific fields because of inaccuracies in response and difficulties in maintaining proper calibration. Most prior apparatus for this purpose have included a cannula connected to an extra-corporeal gauge, and have suffered because of poor pickup and unreliable transmission properties resulting in loss of fidelity in reproduction of the wave-shape of recorded pressure. Additionally, this type of apparatus, because of its intricate construction, has been expensive to manufacture.

The device of the present invention is capable of the same applications as prior gauges described, but provides a much more accurate system wherein faithful and rapid response are insured. Moreover, it can be manufactured much more easily and economically than prior gauges so that it should permit wider use of the advanced medical techniques described. Furthermore, the present device is highly versatile and it may be employed in a wide variety of applications other than blood pressure measurement and other medical applications.

The detection device of the present invention employs one or two light transmission lines in the form of flexible fibers, or fiber bundles, a gauge integral with the transmission line which reflects light in varying degrees in response to the effects to be measured at one end of the transmission line and at the other end of the transmission line a light source which permits light to be transmitted to the gauge and a photosensing means for detecting light received from the gauge back through the transmission line. The fibers are in diameter similar in size to human hairs, i.e. .003–.004 of an inch, although they may be smaller or slightly larger. Fibers have been used for similar purposes as small as .0005 inch in diameter. The fiber must be of considerable length with respect to thickness in order to permit the transmission of light over a relatively long distance. The dimensions and mechanical properties of the fiber or fiber bundle must also permit it to serve as the feed means or part of the feed means for feeding the gauge through a narrow restricted tortuous course such as a human blood vessel. The gauge is of the type which is distortable by pressure at least in the region of the light reflecting area and is effective to vary the amount of light transmitted back through the transmission line depending upon the amount of distortion due to pressure effects resulting from the effect to be measured. In a typical application, light from a remote source is fed through the transmission line which may pass through a blood vessel to the gauge which may be in some specific location such as the heart. Pressure effects on the gauge will cause distortion of the gauge which will change the amount of light reflected by the gauge back into the transmission line. Light reflected back into the transmission line passes back through the same general path back to the light detection means which may be so calibrated that instead of showing light intensity, for example, it may show blood pressure.

There are two principal embodiments of the present invention. In one embodiment there are two light transmitting paths, one for conveying light to the gauge or transducer element and one for conveying light away from the gauge. In other embodiments the same fibers provide the transmission line for light travelling in both directions. In both instances the light transmitting fibers characteristically have high internal reflectance and in preferred embodiments may be fibers in the form of flexible strands of glass.

For better understanding of the present invention reference is made to the accompanying drawings in which.

Figure 1:
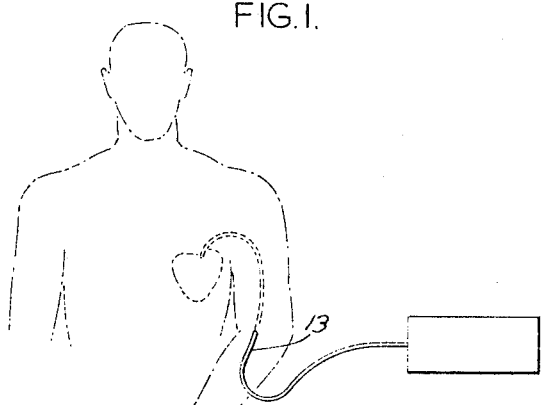
FIG. 1 is a schematic view showing one application of the detection device of the present invention.

FIG. 1 is intended to represent the detection device of the present invention in one application, namely that of blood pressure measurement. In this application the transducer element or gauge is inserted into a blood vessel through the upper arm, for example, and caused to move through the blood vessel into the tortuous restricted path provided thereby by pushing or feeding it further into the blood vessel from the point of entry by means of the fiber transmission line. The flexibility of the transmission line permits it to make such turns and twists as are necessary and it is possible in this manner to feed the gauge to a predetermined location, such as some point in the patient's heart. When in place, blood pressure in that remote and otherwise inaccessible location can be determined by providing light to the gauge through the transmission line and detecting light reflected back from the gauge to the light detection means, thus permitting measurement in the manner indicated above. Better understanding of the structure and measurement will be understood by reference to the other drawings showing effective parts of the transmission line.

Figure 2:
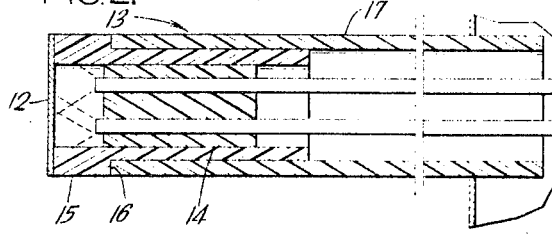
FIG. 2 is a schematic view partially in section illustrating the two fiber embodiments of the present invention with the fiber light transmitting lines greatly foreshortened by omission of all but its terminal parts.

FIG. 2 illustrates schematically a fluid pressure gauge in accordance with the present invention wherein separate light transmissive elements 10 and 11 in the form of long flexible fibers of glass sold under the trademark Fiberglas are employed in connection with a light reflecting surface 12 of a light reflecting transducer element generally designated 13. In this particular embodiment the ends of the light transmissive fibers 10 and 11 are held fixed relative to one another with their axes parallel and laterally spaced by a plug 14 which may be composed of resinous material cast directly in casing 15 so as to hold the ends of fibers 10 and 11 spaced from the end of the casing 15 across which is stretched the flexible reflecting member 12. The casing 15 and the plug 14 are preferably rigid and fluid tight and the flexible reflecting member 12 is designed to respond to pressure of fluids external of the casing and in which the casing may be immersed. The flexible member 12 is advantageously also designed to provide a sealing means across the end of the casing which it closes.

The casing 15 is preferably of generally cylindrical form and is provided with a shoulder 16 between two outer diameters. If desired, a suitable flexible fluid tight tubing 17 may be cemented or otherwise held in place against shoulder 16, as illustrated, so as to provide a smooth surface with the larger outer diameter of casing 15. The tubing thus provides a protective enclosure for fibers 10 and 11 to whatever length is required.

The fiber 10 provides a light transmissive path by virtue of its high internal reflectance. Thus, light from source 18 may be focused by means 19 into the end of the fiber 10 remote from the light reflecting transducer element 13.

The fiber diameter is characteristically on the order of the diameter of a human hair and its length is sufficiently great with respect to the diameter that it is highly flexible. Flexibility permits passage through narrow tortuous passages such as blood vessels. Despite this flexibility, however, the fibers themselves are capable of feeding transducer 13 into a blood vessel or like passage.

Figure 3:
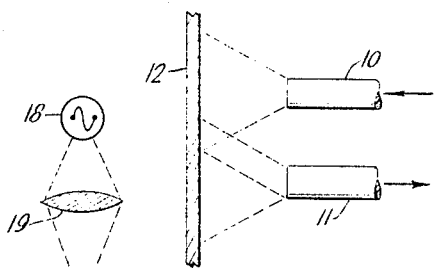
FIG. 3 is a detailed schematic representation illustrating how light from one fiber is reflected into the other by the reflecting transducer element.
Figure 4:
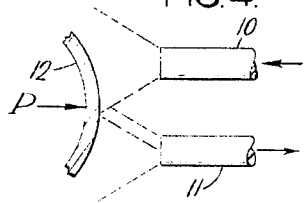
FIG. 4 is a schematic view similar to FIG. 3 showing how applied pressure changes the amount of reflected light received from said other fiber.

As can be seen in FIGS. 3 and 4 enlarged from FIG. 1, when the light transmitted along fiber 10 reaches the end of that fiber, it emerges in a conical or frusto-conical pattern to provide a circular pattern on a distortable flexible surface 12 inside transducer 13. If a mirror reflector is provided for surface 12, essentially all of the light is reflected, but only a limited portion of the light reflected is within a critical angle of the axis of fiber 11 so that it is capable of entering that fiber in such a way that it may be transmitted along the fiber by internal reflectance. Internally reflected light is transmitted along a fiber, whether fiber 10 or 11, with minimum attenuation, whereas other light which enters the fiber is quickly dissipated. The light which emerges from the end of fiber 11, remote from the transducer element 12, is then detected by a suitable pickup means 20, preferably after being concentrated by means of a lens 21, or other suitable means. The detection means 20 may be connected into a variety of suitable circuits wherein is provided either recording means or a meter indicating changes in reflected light intensity. These changes are proportional to the changes in fluid pressure which is acting upon the flexible reflecting transducer element 12, whether the fluid pressure or some other effect inducing changes in fluid pressure is to be measured. In this particular case as pressure is applied to the transducer element and pressure increases the amount of light returned through the light transmissive path of fiber 11 will decrease, and conversely as pressure is released the amount of the light passing through the light transmitting path will increase. Since it is light which is involved, the response of the gauge is limited only by the ancillary pickup, or detection equipment, used in connection with the photocell or other detection means.

Figure 5:
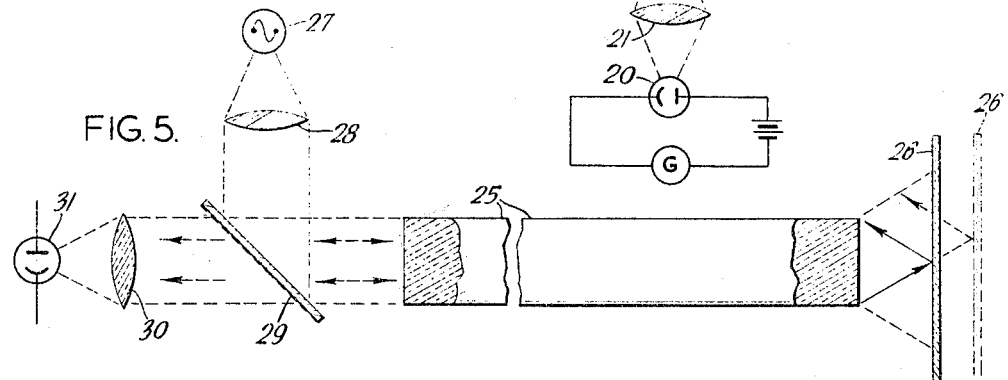
FIG. 5 is a schematic view in which a single light transmissive fiber is used to convey light to and from a light reflecting transducer element with the fiber transmission line greatly foreshortened by omission of all but its terminal parts.

Although the arrangement provided in FIG. 2 can be quite small in diameter, even greater reduction in transducer size can be achieved by the arrangement, the terminal ends of which are illustrated in FIG. 5. In FIG. 5, 25 represents the opposite ends of an extended fiber of glass or other suitable material having high internal reflectance properties. A transducer element 26 having a reflective surface is axially aligned with one end of the fiber and laterally spaced therefrom. This transducer element is arranged to move axially back and forth, toward and from, the end of the fiber in response to forces or pressures which are indicative of the effect to be measured, whatever it may be. In this case, light from light source 27 is concentrated by lens or other suitable means and reflected into the end of the fiber 25 remote from the reflecting surface by half-silvered member 29 placed at an appropriate angle. Light entering this end of the fiber eventually passes out the end of the fiber adjacent the transducer element 26 in the frusto-conical pattern illustrated. Depending upon the spacing of the reflective member 26 from the end of the fiber, a certain amount of the light is reflected back into the fiber at an angle which will support its transmission by internal reflectance back to the end of the fiber whence the light originated and out the end of the fiber 25, in part through the half-silvered mirror 29 and the light concentrating element 30 to phototube 31 or other suitable pickup.

Again, the light reflected is proportional to the position of the transducer element 26 which is determined by the pressure or force existing as a result of the effect to be measured. Since the position of transducer element 26 is proportional to the effect to be measured and hence the amount of light reflected, a fixed proportion of which reaches detection means 31, is proportional to the effect to be measured, the meter or recording means may be calibrated directly in terms of the effect to be measured.

In practical arrangements of the embodiment of FIG. 5, termination means providing the light transducer element must be provided integrally or permanently attached to the end of the fiber which accepts reflected light. Various suitable termination means for this purpose are illustrated in FIGS. 6, 7 and 8.

Figure 6:
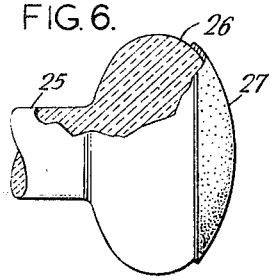
FIG. 6 is a plan view partially in section illustrating a modified transducer end of the embodiment of FIG. 5.

In FIG. 6 the fiber 25 is terminated in a prestressed aspherical bulbous portion 26 which tends to be distorted into spherical form by fluid pressure. The amount of distortion depends upon the elasticity and prestressed condition of the member, and for many purposes the aspherical bulb 26 may be constructed of the same material as the fiber 25 and integrally therewith. To improve reflection properties, the outside of the bulb 27, against which light is projected, may be coated with silver or other suitable highly reflective materials and, in turn, coated with a suitable protective substance. In this particular embodiment as fluid pressure increases the aspherical body 26 tends to assume a more closely spherical form so that the reflective area is moved further and further from the junction between fiber 25 and the aspherical bulbous portion, thus tending to decrease the amount of reflection. However, this tendency, in accordance with some designs, may be more than compensated by the concavity of the reflective mirror surface in accordance with the particular dimensions, deformation properties, and the like, which will determine the response characteristics of a particular structure.

Figure 7:
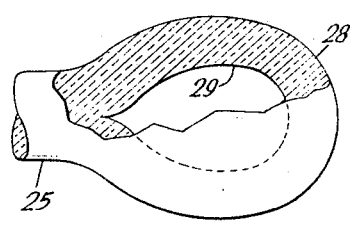
FIG. 7 is a plan view partially in section showing yet another modified transducer end of the embodiment of FIG. 5.

FIG. 7 illustrates a modified bulbous termination 28 for fiber 25. In this case, the bulbous portion has a hollow center region 29 around which light flow is diverted in all directions in continuous flow paths which are smooth and continuous with the fiber. The bulbous portion is designed, however, so that the curvature of portions of the path exceed a critical angle and, therefore, certain parts of the light will fail to be internally reflected and lost. The amount of this attenuation depends upon the amount of curvature of the path at a given time, and the shape of the path is determined by pressure on the outside surface which tends to make the bulbous portion assume more nearly spherical form.

Figure 8:
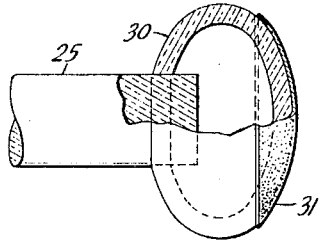
FIG. 8 is a plan view partially in section showing still another modified transducer end of the embodiment of FIG. 5.

The termination of fiber 25 illustrated in FIG. 8 acts essentially like that of the structure shown in FIG. 5. In this case a thin walled bulbous portion 30 is fixed to the sidewalls of the fiber 25 adjacent its end such that the end protrudes into the hollow bulb. Again, the outer surface of the bulb onto which light is projected may be silvered to improve reflectance. The pressure of the fluid in which the gauge is immersed causes bulb 30 to assume a more nearly spherical form with increased pressure, as in the previous case, thus changing the amount of light reflected back into fiber 25 which is capable of transmission by internal reflectance.

Various embodiments of the present invention have been described in some detail. It will be obvious from the various forms shown that other embodiments may be employed. Modifications within the scope of the claims are intended to be within the scope and spirit of the present invention.

I claim:
1. A detection device for measurement of pressure and pressure related effects comprising in combination a remote light source, a flexible light transmissive fiber transmission line of considerable length with respect to thickness, which thickness is sufficiently small to permit the feeding of the fiber transmission line through a narrow restricted and tortuous course, said transmission line serving as its own feed means through such tortuous course, said transmission line consisting of a light transmitting fiber path having high internal reflectance properties such that the same fiber serves for conveying light from the remote light source at one end of the transmission line to the other end and for transmitting reflected light from said other end in the other direction back to the end at the remote light source, a light reflecting transducer element sufficiently small to pass through a human blood vessel integral with the transmission line end of generally bulbous form terminating the end of the transmission line remote from the light source and providing a light reflecting surface positioned axially in the direction of light transmission along the length of the transmission line, such that a change in the shape of the bulbous element in response to changes in pressure will distort the reflecting surface and thereby cause different amounts of light to be reflected back through the transmission line in accordance with a limited predetermined change of shape of the bulbous member, and light detection means positioned at the same remote end of the transmission line as the light source in position to receive light reflected by the transducer element back to the detection means.

2. The detection device of claim 1 wherein the transducer element comprises a solid flexible aspherical bulb fixed to the end of said light transmission line and distortable by pressure into a more spherical form, said aspherical bulb having an internal reflective surface of concave form aligned with the transmission line on the side opposite the point of attachment to the transmission line.

3. The detection device of claim 1 wherein the transducer element comprises a member formed integrally and continuously with one end of the light transmission line, said member being in the form of an aspherical hollow bulb arranged to transmit light around a curved path around the hollow and back into the transmission line, said bulb being distortable by external pressure to assume a more spherical form which distortion changes the curvature of the curved path and therefore the amount of internal reflection and loss as light travels around the hollow bulb so that the amount of light returned to the light source end of the transmission line varies with pressure.

4. The detection device of claim 1 wherein the transducer element comprises a hollow aspherical member fixed to the end of said transmission line and distortable by pressure into a more spherical form, said aspherical ball having a concave reflective surface aligned with the transmission line on the side opposite from the point of attachment to the transmission line so that as changes in pressure change the shape of the bulb there are corresponding changes in the amount of light reflected back into the transmission line.

5. A detection device for measurement of pressure and pressure related effects comprising in combination a remote light source, a flexible light transmissive fiber transmission line, including first and second light transmissive fiber paths of considerable length with respect to thickness, which thickness is sufficiently small to permit the feeding of the fiber transmission line through a narrow restricted and tortuous course, said transmission line serving as its own feed means through such tortuous course, the first of said light transmissive paths serving to convey the light from the remote light source at one end of said transmission line to the other end and the second of said paths serving to transmit reflected light from the other end back to the end of the light source, a light reflecting transducer element sufficiently small to pass through a human blood vessel fixed to the other end of the transmission line, at which end of the fibers constituting paths are fixed together immovably relative to one another inside a casing, said transducer element having a pressure distortable light reflecting surface fixed to the casing opposite the ends of the fibers and positioned axially in the direction of light transmission along the length of the transmission line but provided with a limted pre-determined pattern of movement with respect to the region of the affixation to the transmission line such that changes in pressure change the distortion of the light reflecting surface to reflect varying amounts of light from the first fiber path into the second fiber path and such that the pressure encountered by the transducer element bears a fixed relationship to the amount of light reflected into said second path, and light detection means positioned at the same end of the transmission line as the light source but at the end of the second light transmissive fiber path in position to receive light reflected by the transducer element back through that path.

References Cited by the Examiner
UNITED STATES PATENTS 2,415,436   2/1947   Maris _____ 88—14
3,068,739   12/1962  Hicks et al. _____ 88—14

OTHER REFERENCES

Roberts, "Electric Gaging Methods," Instruments, vol. 18, pages 82–86, February 1945.

JEWELL H. PEDERSEN, *Primary Examiner.*

JOHN K. CORBIN, *Examiner.*